W. STEPHENS.
Watchmakers' Lathe.
No. 16,811.
Patented March 10, 1857.
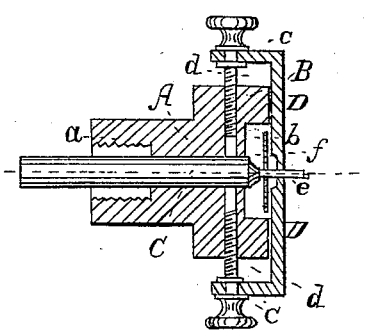
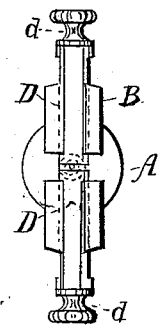
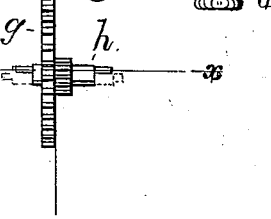
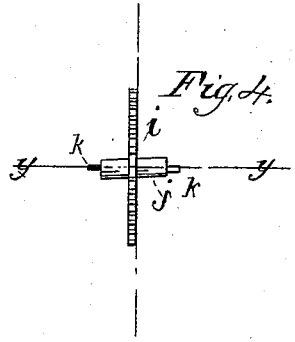

UNITED STATES PATENT OFFICE.

WM. STEPHENS, OF RICHMOND, INDIANA.

CHUCK FOR WATCHMAKERS' LATHES.

Specification of Letters Patent No. 16,811, dated March 10, 1857.

*To all whom it may concern:*

Be it known that I, WILLIAM STEPHENS, of Richmond, in the county of Wayne and State of Indiana, have invented a new and Improved Chuck for Watchmakers' Lathes; and I do hereby declare that the following is a full, clear, and exact description of the same, reference being had to the annexed drawings, making a part of this specification, in which—

Figure 1 is a longitudinal vertical section of my improvement, the plane of section being through the center. Fig. 2 is a front or face view of the same. Figs. 3 and 4 are detached views of wheels and pinions, such as are used in, or which form part of, a watch train or movement.

Similar letters of reference in the figures where they occur, indicate corresponding parts.

This invention consists in constructing or forming the chuck of two sliding or adjustable jaws and an adjustable back center; the above parts being fitted within a proper head, and arranged as will be hereinafter fully shown and described, whereby the shafts of pinions may have their journals or pivots turned on them either concentrically or eccentrically with their shafts, so that the pivots or journals may be made in line with the centers of the wheels and pinions upon the shafts.

To enable those skilled in the art to fully understand and construct my invention, I will proceed to describe it.

A represents a cylinder which has a bar or plate B at its outer end; the bar or plate being placed transversely with the cylinder A, so as to be of T form, as shown clearly in Fig. 1. The cylinder and bar are constructed of metal and formed or cast in one piece, and constitute the head or stock of the chuck. Within the cylinder A, a rod, C, is placed longitudinally; said rod being allowed to slide back and forth within the cylinder. The rod, C, has a center hole made in its outer end. The end of the cylinder, A, is tapped out, or has a screw thread (*a*) cut within it, for the purpose of allowing it to be screwed on to the mandrel of the lathe.

The bar or plate B has a slot or opening (*b*) made through it; and in the face or outer side of the bar or plate, B, two jaws, D, D, are fitted; said jaws being fitted in dovetail grooves. The outer end of each jaw D has a plate (*c*) attached to it, at right angles; and through these plates (*c*) pass screws (*d*); the said screws passing into the ends of the plate or bar B as shown clearly in Fig. 1.

It will be seen that, by turning the screws (*d*), the jaws, D, D, may be made to approach each other, or recede from each other; the jaws being allowed to slide freely in the face of the plate or bar, B.

By referring to Fig. 1, it will be seen that the shaft (*e*) of a wheel, (*f*), is fitted between the two jaws, D D; one end of the shaft being fitted in the center hole in the end of the rod C. The wheel (*f*) fits in the slot or opening (*b*) in the bar or plate B.

It will also be seen that by adjusting the jaws, D D, the outer end of the shaft (*e*) may be brought in any position out of center or line with the inner end of the shaft; consequently a pivot or journal may be turned out of line or eccentrically with the shaft (*e*); and the shaft (*e*) may be taken out of the chuck, and reversed; so that the end that was formerly fitted in the back center will be placed outward, and the end on which the pivot was first turned will be placed in the back center. Thus a pivot or journal may be turned with facility on either end of the shaft, and either eccentrically or concentrically with it. In consequence of having the rod C slide in the cylinder A, the back center may be adjusted to fit shafts of varying lengths.

By referring to Figs. 3 and 4, the utility of the invention will be plainly seen. In Fig. 3, a wheel (*g*) is shown, placed out of center on its shaft (*h*). The wheel and shaft being such as are used in watch movements, of course the wheel cannot be readily detached from and replaced, true on its shaft. But by properly placing or adjusting the shaft between the two jaws, D D, so as to place it more or less out of line, the pivots may be turned on the ends of the shaft (*h*), eccentrically with the shaft, so that the pivots will be in line with the center of the wheel (*g*). In Fig. 3, (*x*) (*x*) shows the line of the pivots turned eccentrically, on the shaft (*h*), so that the line (*x*) (*x*) passes through the center of the wheel (*g*). In Fig. 4, a wheel (*i*) is shown, placed obliquely on a shaft (*j*); the pivots (*k*) are consequently turned eccentrically with the shaft (*j*), and at opposite sides at the ends of the shaft, so that the wheel (*i*)

will be at right angles with the line $(y)$ $(y)$, which passes through the pivots $(k)$. The pivots or journals of shafts are now formed partially by hand, with a file, and partially by turning them in a lathe; the shaft being fitted between the two centers. But, in the usual lathe, the shaft cannot be reversed, nor can the pivots be turned eccentrically with the shaft.

I am aware that a chuck has been invented, to be used in connection with cement for holding the shaft and wheel; but these chucks will only allow concentric pivots to be turned.

I would remark that, by my improvement, the ends of shafts may be drilled either concentrically or eccentrically, to allow pivots to be fitted in the ends of the shaft, in case the former pivots of a shaft are broken off. This cannot be done in the usual lathe, nor by any tool used by watch-makers.

I do not claim, separately, the sliding or adjustable jaws, D D, for they have been previously used, on chucks; but What I do claim as new, and desire to secure by Letters-Patent, is:

The sliding or adjustable jaws, D D, in combination with the sliding or adjustable back center rod C, arranged substantially as described for the purpose set forth.

WILLIAM STEPHENS.

Witnesses:
 JOHN FINLEY,
 EDWIN M. COOK.